United States Patent
Cabrera et al.

(10) Patent No.: US 7,065,674 B2
(45) Date of Patent: Jun. 20, 2006

(54) COMPUTER SYSTEM FAULT RECOVERY USING DISTRIBUTED FAULT-RECOVERY INFORMATION

(75) Inventors: Luis Felipe Cabrera, Bellevue, WA (US); Marvin Michael Theimer, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 10/209,773

(22) Filed: Aug. 1, 2002

(65) Prior Publication Data

US 2004/0025076 A1 Feb. 5, 2004

(51) Int. Cl.
*G06F 11/00* (2006.01)

(52) U.S. Cl. .................. 714/16; 714/6; 714/4; 709/223; 707/202; 707/204

(58) Field of Classification Search ................ 714/2, 714/4, 6, 20; 707/202, 204
See application file for complete search history.

(56) References Cited

U.S. PATENT DOCUMENTS

| | | | | |
|---|---|---|---|---|
| 5,210,861 A | * | 5/1993 | Shimoda | 714/32 |
| 5,434,994 A | * | 7/1995 | Shaheen et al. | 709/223 |
| 5,737,601 A | * | 4/1998 | Jain et al. | 707/201 |
| 5,815,649 A | * | 9/1998 | Utter et al. | 714/6 |
| 6,023,775 A | * | 2/2000 | Fujii | 714/48 |
| 6,728,751 B1 | * | 4/2004 | Cato et al. | 709/202 |
| 6,732,125 B1 | * | 5/2004 | Autrey et al. | 707/204 |
| 2002/0138551 A1 | * | 9/2002 | Erickson | 709/203 |
| 2003/0196148 A1 | * | 10/2003 | Harrisville-Wolff et al. | 714/47 |

\* cited by examiner

*Primary Examiner*—Robert Beausoliel
*Assistant Examiner*—Philip Guyton
(74) *Attorney, Agent, or Firm*—Banner & Witcoff, Ltd

(57) ABSTRACT

Fault-recovery information for transactional operations between computer systems and the outcome of those operations is logged at the originating point of the units of work, such as source-computer systems, which may include client computers in a client/server system. By using these distributed logs of fault-recovery information, a target-computer system, which may include a server computer, can reconstruct the target-computer system's previous interaction with various source-computer systems. Source-computer systems may use a proxy server for logging fault-recovery information to persistent storage. A target-computer system may digitally sign the fault-recovery information it sends to a source-computer system thereby making the fault-recovery information's authenticity verifiable. Similarly, the target-computer system may encrypt the fault-recovery information before sending it to the source-computer system to preserve the privacy of the fault-recovery information.

58 Claims, 5 Drawing Sheets

COMPUTER SYSTEM FAULT RECOVERY USING DISTRIBUTED FAULT-RECOVERY INFORMATION

TECHNICAL FIELD

The invention relates generally to fault recovery of computer systems and more particularly to fault recovery using distributed fault-recovery information.

BACKGROUND OF THE INVENTION

Current transactional recovery techniques for transactions performed via a client-server system typically use logs kept at servers to recover from system crashes. The use of these centralized logs, when needed, enables the rollback in time and the replaying of relevant operations.

Fault recovery techniques are typically sub-divided into phases: one phase that records information while a computer system is operating normally; and another phase that uses the previously recorded information to perform recovery after a computer-system failure.

During the recording phase, before committing to performing an operation, such as a transaction, the fault recovery system may "flush" or write log information to disk storage. Then, the system will be ready to commit to performing the transaction. Accordingly, if there is a failure while the transaction is being performed, the system can recover from the failure knowing whether or not the transaction was successfully completed. If the transaction has committed, then the transaction can be replayed during the fault recovery phase. If the transaction had not committed when a fault occurred, then during the recovery phase any operations that were performed before the fault occurred (as part of trying to perform the transaction) can be undone to get back to the state or condition of the system before the system started trying to perform the transaction.

Accordingly, with conventional fault-recovery processing for transactions, the transaction processing system begins in a consistent (i.e., known) state, and an all-or-nothing change of state is applied depending upon whether the transaction is performed or not. The transaction-processing system then ends up in a consistent state, namely, either the original (pre-transaction) state, or a new post-transaction state. This makes it possible to log, for example, bank transactions such as depositing money to a checking account.

In an existing client/server interaction for purchasing a book, for instance, the client computer sends a specific request to the server, the server processes it on behalf of the client and then returns the result of the purchase operation to the client. There might be several message exchanges to gather the necessary information. But once the server gets the necessary information from the client, the state of the operation, also referred to as the fault-recovery information for the operation, is logged at the server and the overall transaction is either committed or aborted. Thus, the log records that describe this operation are stored at the server. Typically, the client is not responsible for tracking or preserving this fault-recovery information. In general, client computers typically do not retain fault-recovery information regarding past interactions with various servers. Instead, the servers tend to preserve this type of information.

This conventional fault-recovery approach excludes clients from participating in the recovery of a fatal failure of a server. Were a server to be destroyed, the clients that have interacted with the server are typically unable to participate in the recovery of the server. Furthermore, conventional approaches to fault-recovery typically do not extend to pure peer-to-peer computing where there is no central server to preserve transaction state.

Accordingly, improved fault-recovery techniques that allow client computers to participate in fault recovery of a server and that apply to peer-to-peer systems would be desirable.

SUMMARY OF THE INVENTION

Fault-recovery information for selected operations and the outcome of those operations is logged at the originating point of the units of work, such as source-computer systems, which may include client computers in a client/server system.

By using these distributed logs of fault-recovery information, a source-computer system can reconstruct the source-computer system's previous interaction with various target-computer systems, which may include servers in a client-server system. If a target computer system fails catastrophically, for instance, if its backup and archive data are lost or destroyed by, for example, a malicious virus, the target-computer system's state can be recreated by using fault-recovery information retained by (or on behalf of) the source computer systems that have interacted with the target computer system. In peer-to-peer systems, this type of fault-recovery information enables reconstruction of pair-wise interactions that a particular peer computer desires to recover after a failure.

Source-computer systems may use a proxy server for logging fault-recovery information to persistent storage. Such a proxy server may benefit a client computer of a source-computer system, for instance, by allowing the client computer to restore to itself some of the client computer's past interactions, as desired. Thus, a client with limited amount of memory may use a proxy server to re-load some past history of events that the client computer may want at a time much later than when the events happened.

Both target-computer-systems and source-computer systems may redundantly log fault-recovery information thereby providing a higher likelihood of successful recovery from a fault. Alternatively, target-computer systems may reduce the amount of fault-recovery information that they log to persistent storage thereby potentially improving server performance, for instance, while still allowing servers to recover from failures. Instead of concentrating fault-recovery logging operations at a server, which can disadvantageously act as a central bottleneck point with respect to server performance, fault-recovery logging operations may be spread, for example, among typically unloaded client computers.

If source-computer systems and target-computer systems belong to different administrative/security domains or if source-computer system corruption of fault-recovery information is a potential concern, then the target-computer system may digitally sign the fault-recovery information it sends to a source-computer system thereby making the authenticity of the fault-recovery information verifiable. At recovery time, the target-computer system may check the digital signatures on the log records it receives from the source-computer system to ensure that it is receiving valid fault-recovery information. By using digital signatures this way, the target-computer system will be able to detect when the client has inadvertently or willfully tampered with the logging information. Using digital signatures may also prevent a malicious source-computer from impersonating a legitimate source-computer system in an attempt to play back bogus log records to the target-computer system. Similarly, a target-computer system may serialize fault-recovery information log records provided to a particular source-computer system so that the target-computer system will be able to make sure that the source-computer system is providing a complete set of fault-recovery information. The state or information that reconstructs these trust relationships may be kept remotely from both the target-computer system and the source-computer system.

A target-computer system may use one or more source-computer systems for storing source-computer-system confidential fault-recovery information. The target-computer system may encrypt the fault-recovery information before sending it to the source-computer system. The encryption keys used for encrypting the fault-recovery information may be stored remotely from both the target-computer system and the source-computer system.

To avoid having to store fault-recovery information from the beginning of time and to reduce the time required to recover from a fault, a target-computer system may provide to one or more source-computer systems a checkpoint or summary of the target-computer system's state. Target-computer system-fault recovery may then include retrieving from the source-computer system the (persistently stored) checkpoint and then replaying, based on fault-recovery information received from one or more source-computer systems, the operations that have occurred since the checkpoint was taken.

A target-computer system may provide successive checkpoints to respective source-computer systems in a rotation scheme for distributed storage of target-computer-system checkpoints. Or a target-computer system may provide substantially all checkpoints to a single source-computer system for storage. Checkpoints may also be stored in a distributed manner in which a target-computer system sends various portions of a checkpoint to respective source-computer system for storage.

Multiple source-computer systems may interact with a single target-computer system, which may include a source-system-identity storage module that coordinates storage of the identities of various source-computer systems that have interacted with the target-computer system. The source-system-identity storage module may exchange this type of source-system-identification information with an escrow server and/or source-computer systems for storage of this information outside of the target-computer system. The target-computer system may also include a fault-recovery module that uses target-system fault-recovery information logged by one or more source-computer systems for recovering from a target-system fault.

Logging identification information for the various source-computer systems that have had transactional interactions with a particular target-computer system may be done in various ways. For example, sets of source-computer systems may store information about each other regarding their respective interactions with various target computer systems. Under normal operation, the target-computer system may provide this type of information for redundant storage by multiple source-computer systems. During recovery of a target-computer system, the source-computer systems may communicate with each other regarding which source-computer systems should send fault-recovery information to the target-computer system.

The source-system-identity storage module and/or one or more source-computer systems may exchange source-computer system-identification information with one or more escrow servers. In this way, the target-computer system and/or the source computer systems may retrieve pertinent information from one or more escrow servers for generating a list of computing end-points, such as various source-computer systems, that should be contacted for recovering a target computer system from a failure.

Additional features and advantages of the invention will be apparent upon reviewing the following detailed description.

DETAILED DESCRIPTION OF THE INVENTION

Aspects of the invention are suitable for use in a variety of distributed computing system environments. In distributed computing environments, tasks may be performed by remote computer devices that are linked through communications networks. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, network PCS, minicomputers, mainframe computers, and the like.

The invention will be described in the general context of computer-executable instructions, such as program modules, that are executed by a personal computer or a server. Generally, program modules include routines, programs, objects, components, data structures, etc., that perform particular tasks or implement particular abstract data types. Typically the functionality of the program modules may be combined or distributed as desired in various environments.

Embodiments within the scope of the present invention also include computer readable media having executable instructions. Such computer readable media can be any available media, which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
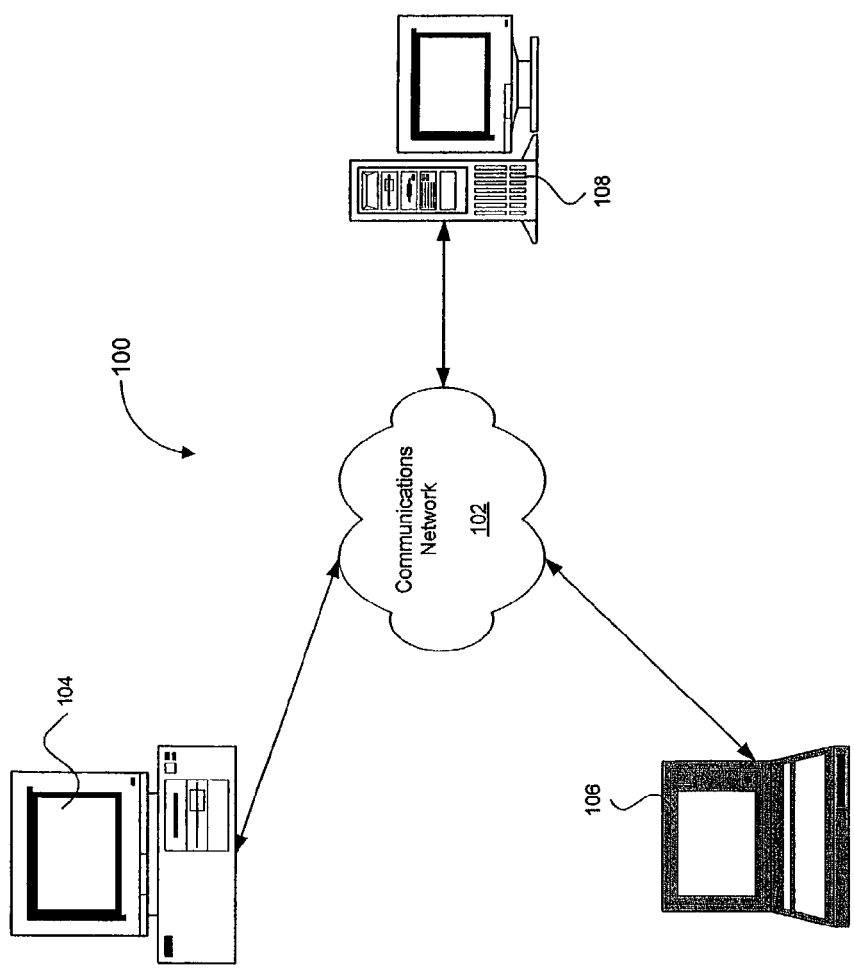
FIG. 1 illustrates an exemplary distributed computing system-operating environment; that can be used to implement various aspects of the present invention.

FIG. 1 illustrates an example of a suitable distributed computing system 100 operating environment in which the invention may be implemented. Distributed computing system 100 is only one example of a suitable operating environment and is not intended to suggest any limitation as to the scope of use or functionality of the invention. System 100 is shown as including a communications network 102. The specific network implementation used can be comprised of, for example, any type of local area network (LAN) and associated LAN topologies and protocols; simple point-to-point networks (such as direct modem-to-modem connection); and wide area network (WAN) implementations, including public Internets and commercial based network services. Systems may also include more than one communication network, such as a LAN coupled to the Internet Computer device 104, computer device 106, and computer device 108 may be coupled to communications network 102 through communication devices. Network interfaces or adapters may be used to connect computer devices 104, 106, and 108 to a LAN. When communications network 102 includes a WAN, modems or other means for establishing communications over WANs may be utilized. Computer devices 104, 106 and 108 may communicate with one another via communication network 102 in ways that are well known in the art. The existence of any of various well-known protocols, such as TCP/IP, Ethernet, FTP, HTTP and the like, is presumed.

Computers devices 104, 106 and 108 may exchange content, applications, messages and other objects via communications network 102. In some aspects of the invention, computer device 108 may be implemented with a server computer or server farm. Computer device 108 may also be configured to provide services to computer devices 104 and 106. Alternatively, computing devices 104, 106, and 108 may also be arranged in a peer-to-peer arrangement in which, for a given operation, ad-hoc relationships among the computing devices may be formed.

Figure 2:
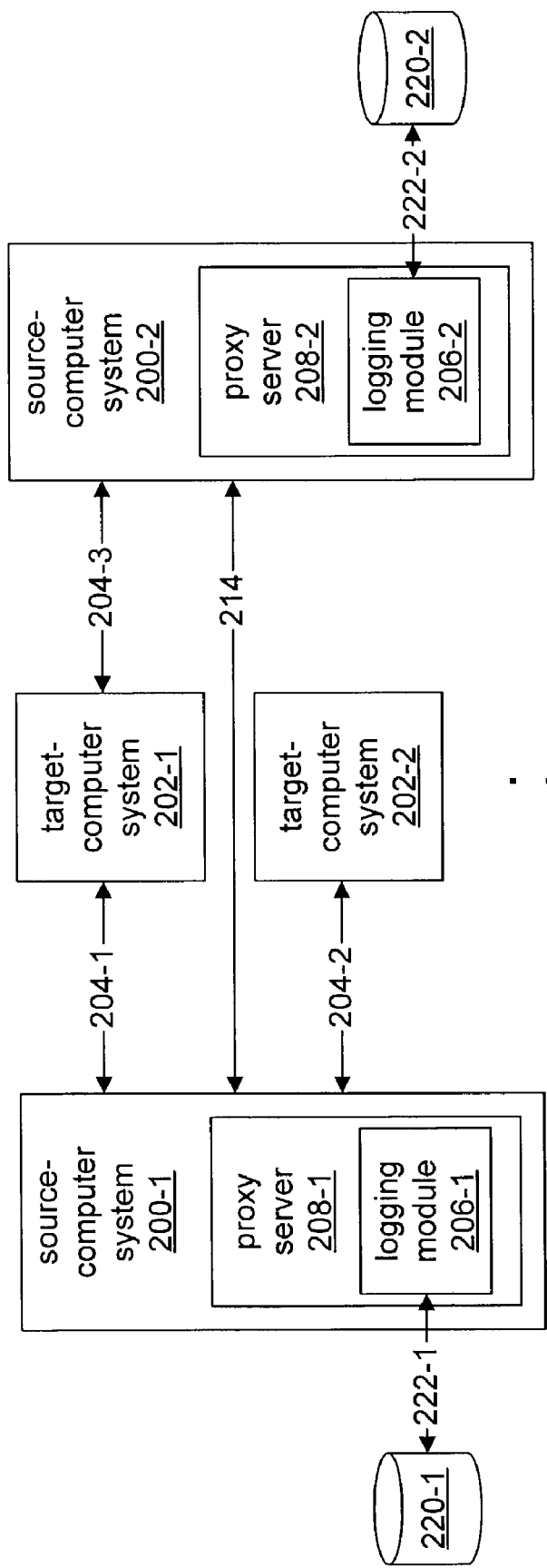
FIG. 2 is a schematic block diagram of a fault recovery system that uses distributed fault-recovery information in accordance with an illustrative embodiment of the invention.

FIG. 2 is a schematic diagram of a system in accordance with an illustrative embodiment of the invention. First and second source-computer systems 200-1 and 200-2 are shown. These source-computer systems may include client computers in a client/server system or computers in a peer-to-peer system. The ellipses beneath the source computer systems 200-1 and 200-2 indicate that additional source computers may be part of a system such as the one shown in FIG. 2.

Target-computer systems 202-1 and 202-2 may each include a server computer that is part of a client/server system. Or the target-computer systems may each include a computer that is part of a peer-to-peer system. The ellipses beneath the target-computer systems 202-1 and 202-2 indicate that additional target computers may be part of a system such as the one shown in FIG. 2.

In accordance with an illustrative embodiment of the invention, fault-recovery information, also referred to as state, for selected operations and the outcome of those operations is logged at the originating point of the units of work, such as source-computer systems 200-1 and 200-2. Logging of fault-recovery information, as used herein, refers to any suitable technique for recording the information, including, but not limited to, a traditional database-oriented log or storing separate fault-recovery information items in independent files. The fault-recovery information may include other suitable information, including, but not limited to, identification of the parties involved in a transaction, identification of the transaction itself in terms of transaction identities that make sense to the target-computer system and in terms of an activity identity that makes sense to the source-computer system, the data that reflects the actual operations performed in the transaction, and the results obtained from the target-computer system for these operations.

By using these distributed logs of fault-recovery information, a source-computer system 200 can reconstruct the source-computer system's previous interaction with various target-computer systems 202. If a target computer system 202 fails catastrophically, for instance, if its backup and archive data are lost or destroyed by, for example, a malicious virus, the target-computer system's state can be recreated by using fault-recovery information retained by (or on behalf of) the source-computer systems 200 that have interacted with the target-computer system 202. In peer-to-peer systems, this type of fault-recovery information, also referred to as distributed log information, enables reconstruction of pair-wise interactions that a particular peer computer desires to recover after a failure.

In accordance with various inventive principles, a source-computer system 200 tracks the activity that it has requested. For instance, if the source computer system 200-1 includes a client computer and the target computer system 202-1 includes a server, and if a user of the client computer buys a book by using the client computer to interact with the server computer, then the source-computer system 200-1 would log the action of purchasing the book from the specific server 202-1 and the result of this action. In this manner, the source computer system 200-1 collects and retains information that can be used to reconstruct its interaction with the server of the target-computer system 202-1. If replayed later, log records of this type would enable the client to "remind" a live server that this particular purchase happened or the log records could be used by a recovery procedure at the server to reconstruct the past purchases that this client has made from the server.

If a client computer of a source-computer system 200 does not want to preserve fault-recovery information or is not able to preserve this type of information, but the client computer wants the benefit of preserving this information so that it will be able to recreate its transactional interactions, then the client computer may use a proxy server, such as proxy server 208-1, to log fault-recovery information to persistent storage. Through interacting with the proxy server, the client computer may then participate in the recovery of a target-computer system with which the client computer has had transactional interactions.

Figure 3:
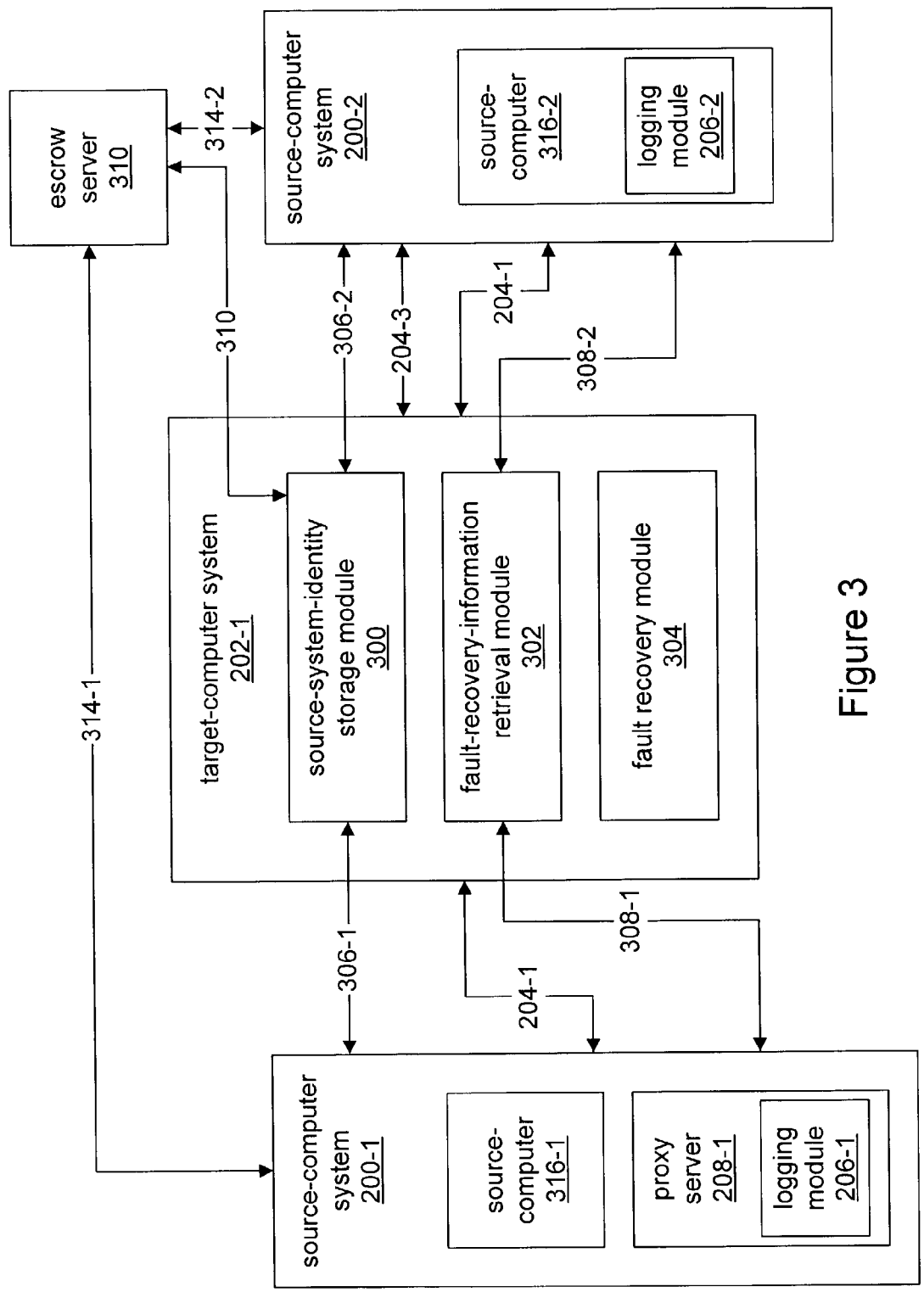
FIG. 3 is similar to FIG. 2 but shows components of a target-computer system, rather than a source-computer system, in more detail.

As an example, source-computer system 200-1 could include a client computer, such as source computer 316-1 (FIG. 3), that interacts with a bank's server computer, which is part of the target-computer system 202-1. The transactions may include, for example, a $300 deposit into a checking account, followed by a $100 withdrawal. State or fault-recovery information for these transactions may be separately logged to persistent storage 220-1 by logging module 206-1. Logging operations of this type are represented in FIG. 2 by double-headed arrows 222-1 and 222-2. The logging module 206-1 may be part of a proxy server 208-1 and the proxy server 208-1 may be included as part of the source computer system 200-1. Although shown within the source-computer system 200-1, the proxy server 206 may be located geographically remotely, (i,e., in a different building, town, state, country, and/or continent) from any client computers that are part of the source computer system 200-1. As shown in FIG. 3, a logging module may run on a proxy server, such as logging module 206-1 and proxy server 208-1; or, a logging module may run on a source computer, such as logging module 206-2 and source computer 316-2.

Such a proxy server may also benefit a client computer by allowing the client computer to restore to itself some of the client computer's past interactions, as desired. Thus, a client with limited amount of memory may use a proxy server to re-load some past history of events that the client may want at a time much later than when the events happened. In accordance with an illustrative embodiment of the invention, multiple source-computer systems, such as source-computer systems 200-1 and 200-2, may each have their own separate corresponding proxy servers, such as proxy servers 208-1 and 208-2.

Multiple source-computer systems, such as source-computer systems 200-1 and 200-2, may interact with a single target-computer system, such as target-computer system 202-1. Interaction between source-computer system 200-1 and target computer system 202 is represented by double-headed arrow 204-1. Interaction between source-computer system 200-2 and target computer system 202 is represented by double-headed arrow 204-3. Interaction of this type may include communication of fault-recovery information between the target computer system 202 and the source computer systems 200.

Source-computer system 200-1 may log to persistent storage, such as disk-storage device 220-1, fault-recovery information for interaction between source-computer system 200-1 and one or more target-computer systems, such as target-computer systems 202-1 and 202-2. An analogous disk-storage device 220-2 is shown associated with source-computer system 200-2. More generally, source-computer system 200-1 may log to persistent storage, fault recovery information for interaction between one or more source computer systems and one or more target computer systems. Target-computer system 202-1 may provide to source-computer system 200-1 fault-recovery information regarding interaction between target-computer system 202-1 and one or more source-computer systems 200 other than source-computer system 200-1.

In accordance with various inventive principles, both target-computer-systems 202 and source-computer systems 200 may redundantly log fault-recovery information thereby providing a higher likelihood of successful recovery from a fault. Alternatively, target-computer systems 202 may reduce the amount of fault-recovery information that they log to persistent storage thereby potentially improving server performance, for instance, while still allowing servers to recover from failures. Instead of concentrating fault-recovery logging operations at a server, which can disadvantageously act as a central bottleneck point with respect to server performance, fault-recovery logging operations may be spread, for example, among typically unloaded client computers.

In accordance with various inventive principles, a server, for example, may log transactional update state but forego the activity of archival backup to a disaster recovery site. In this case, the client computers that interact with the server may keep the distributed fault-recovery information, which may then act as the archival backup copy of the server's state or fault-recovery information. The server's logging information enables quick, client-independent—and hence non-distributed—recovery from machine crashes.

Alternatively, a server, for example, could forego logging of fault-recovery information and rely on client-side log information when the server performs fault recovery. In this manner, a centralized server may transfer to a large number of parallel, distributed client machines the overhead associated with logging fault-recovery information. The server may then do without a (typically dedicated) persistent storage device for logging fault-recovery information. Under these circumstances, though, to fully reconstruct the desired state of a server, substantially all pertinent clients should be contacted and their operations re-played. Thus fault recovery may be delayed by the unavailability of any of the clients. Having source-computer systems 200 replicate logging information among themselves may mitigate this situation. Communication of this type of replicated fault-recovery information is depicted by double-headed arrow 214 in FIG. 2. Replication may be done asynchronously in the background with respect to any client/server requests to avoid slowing down directly client-visible performance. As discussed in more detail below, a target-computer system 202 may coordinate storage of information identifying the source-computer systems 200 that the target-computer system 202 has had interactions with.

As will be apparent, if a fault occurs that pertains only to one or a subset of source-computer systems for which a target-computer system 202 has interacted, fault recovery may be performed for fewer than all of the source-computer systems with which the target-computer system has interacted. For instance, some malicious activity might have erased any record of transactions performed by a target-computer system 202 with a particular source-computer system 200. Under these circumstances, the target-computer system 202 may request that records pertinent to this particular source-computer system 200, but not records pertinent to other source-computer systems 200, be played back for fault-recovery purposes. This type of requested information may also be used for auditing the state of the target-computer system 202 for detecting any state corruption that may have occurred, such as damage caused by a virus. That is, the information can be used both to check for selective faults and state corruption on the target-computer system, as well as for performing actual fault recovery.

If source-computer systems 200 and target-computer systems 202 belong to different administrative/security domains or if source-computer system corruption of fault-recovery information is a potential concern, then the target-computer system 202 may digitally sign the fault-recovery information it sends to a source-computer system 200 in response to a request, thereby making the authenticity of the fault-recovery information verifiable. At recovery time, the target-computer system 202 may check the digital signatures on the log records it receives from the source-computer system 200 to ensure that it is receiving valid fault-recovery information. By using digital signatures this way, the target-computer system will be able to detect when the client has inadvertently or willfully tampered with the logging information.

Similarly, a target-computer system 202 may serialize fault-recovery information log records provided to a particular source-computer system 200 so that the target-computer system 202 will be able to make sure that the source-computer system is providing a complete set of fault-recovery information. Serialization of the fault-recovery information may take the form of a continuity counter included with the fault recovery information sent from a target-computer system 202 to a source-computer system 200. In this way, the target-computer system 202 may check to make sure that the continuity-counter values increase as expected from one log record to the next as the log records are returned by the source-computer-system 200 to the target computer system 202. This may prevent the source-computer system 200 from adding or deleting fault-recovery log records to or from those received from the target computer system 202. For instance, if banking transactions are being recovered, this type of serialization may prevent the source-computer system 200 from providing fault-recovery information describing only deposits, instead of both deposits and withdrawals.

The state or information that reconstructs the trust relationships discussed above, namely, a target-computer system's private encryption key and/or serialization of the fault-recovery information, may be kept, in a recoverable manner, remotely from both the target-computer system 202 and the source-computer system 200. During fault recovery, the target computer system 202 may then retrieve and use the target-computer system's private encryption key and/or the serialization information.

A target-computer system may use one or more source-computer systems 200 for storing source-computer-system confidential fault-recovery information. In other words, the source-computer system may be a convenient place for the target computer system to store the information, but the target-computer system may not want the source-computer system to be able to access the fault-recovery information. Under these circumstances, the target-computer system 202 may encrypt the fault-recovery information before sending it to the source-computer system 200. The encryption keys used for encrypting the fault-recovery information may be stored remotely from both the target-computer system 202 and the source-computer system 200. During fault recovery, the target-computer system 202 may then retrieve and use the encryption keys.

In accordance with various inventive principles, a source-computer system 200 logs a sufficient amount of fault-recovery information so that when the fault-recovery information is provided to the target-computer system 202 during fault recovery, the target-computer system 202 may re-create substantially all of its internal logic. For instance, if source-computer system 200-1 includes a client computer that interacts with a bank's server computer within target-computer system 202-1 for performing deposits and withdrawals, then source-computer system 200-1 may log to persistent storage 220-1 fault-recovery information that will allow the target-computer system 202-1 to reconstruct its records of each transaction performed with the source-computer system 200-1 during a time period of interest. In this way, during fault recovery, the bank's server computer may faithfully (i.e., accurately and thoroughly) reconstruct its internal logic, which may be based on the fault-recovery information, as opposed to retrieving from the client computer merely an indication of what the current account balance should be. Stated differently, the fault-recovery information may preserve the history of a source-computer system's interaction with a target-computer system 202, as opposed to preserving merely the current status but not the history of transactions.

To avoid having to store fault-recovery information from the beginning of time and to reduce the time required to recover from a fault, a target-computer system 202 may provide to one or more source-computer systems 200 a checkpoint or summary of the target-computer system's state. Target-computer system-fault recovery may then include retrieving from the source-computer system 200 the (persistently stored) checkpoint and then replaying, based on fault-recovery information received from one or more source-computer systems 200, the operations that have occurred since the checkpoint was taken.

A target-computer system 202 may provide successive checkpoints to respective source-computer systems in a rotation scheme for distributed storage of target-computer-system checkpoints. Or a target-computer system 202 may provide substantially all checkpoints to a single source-computer system 200 for storage. Checkpoints may also be stored in a distributed manner in which a target-computer system sends various portions of a checkpoint to respective source-computer systems 200 for storage.

In accordance with an illustrative embodiment of the invention, substantially all log records since a checkpoint may be used when recovering from a fault, such as a crash. Alternatively, or in addition, a target-computer system 202 may create summary records that encode substantially all relevant log records in a relatively compact form. Summary records may encode some, but not all of, the state information represented by a given set of log records. If substantially all of the state information, which is represented by log records that have occurred after a checkpoint, is encoded in a summary record, then the summary record is effectively a checkpoint record.

To prune a source-computer system's logged fault-recovery information in accordance with checkpoints that have been taken, a target-computer system 202 may inform source-computer systems when the source-computer systems 200 should prune their logs. This type of log-pruning information may be communicated as an addendum to replies the target-computer system 202 makes to transaction requests from a source-computer system 200.

Referring to FIG. 3, multiple source-computer systems, such as source-computer systems 200-1 and 200-2, may interact with a single target-computer system, such as target-computer system 202-1. The target-computer system 202-1 may include a source-system-identity storage module 300, which may coordinate storage of the identities of various source-computer systems 200 that the target-computer system 202-1 has interacted with and which have logged target-system fault-recovery information. The source-system-identity storage module 300 may exchange this type of source-system-identification information with an escrow server 310, and/or source-computer systems 200, as indicated in FIG. 3 by double-headed arrows 310, 306-1, and 306-2, for storage of this information outside of the target-computer system 2021. The target-computer system 202-1 may also include a fault-recovery module 304 that uses target-system fault-recovery information logged by one or more source-computer systems 200 for recovering from a target-system fault.

Logging identification information for the various source-computer systems 200 that have had transactional interactions with a particular target-computer system may be done in various ways. For example, sets of source-computer systems 200 may store information about each other regarding their respective interactions with various target computer systems 202. This information may include identification information for any external proxy servers used for logging fault-recovery information. Under normal operation, a target-computer system 202 may provide this type of information for redundant storage by multiple source-computer systems 200. During recovery of a target-computer system 202, the source-computer systems 200 may communicate with each other, as indicated by double-headed arrow 214 in FIG. 2, regarding which source-computer systems 200 should send fault-recovery information to the target-computer system 202. This gossip-like dissemination of source-computer system-identification information provides a source-computer-system-based storage of this information in the absence of any central "white pages" that identifies the source-computer systems 200 that have interacted with a particular target-computer system 202.

The source-system-identity storage module 300 within target-computer system 202-1 and/or one or more source-computer systems, such as source-computer systems 200-1 and 200-2, may exchange source-computer system-identification information with one or more escrow servers, such as escrow server 310, as indicated by double-headed arrow 310, 314-1, and 314-2. In this way, the target-computer system 202-1 and/or the source computer systems 200 may retrieve pertinent information from one or more escrow servers 310 for generating a list of computing end-points, such as various source-computer systems 200, that should be contacted for recovering a target computer system from a fault.

After a target-computer system failure, the fault-recovery-information retrieval module 302 of target-computer system 202-1 may contact source-computer systems, such as source-computer systems 200-1 and 200-2, and may request fault-recovery information for transactions performed at or after a specified time from the source-computer systems 200. This type of request and any fault-recovery information provided in response are represented in FIG. 3 by double-headed arrows 308-1 and 308-2. The fault recovery module 304 of the target-computer system 202-1 may then recreate the target-computer system's state by playing back transactions described by the fault-recovery information from the source-computer systems 200.

Figure 4:
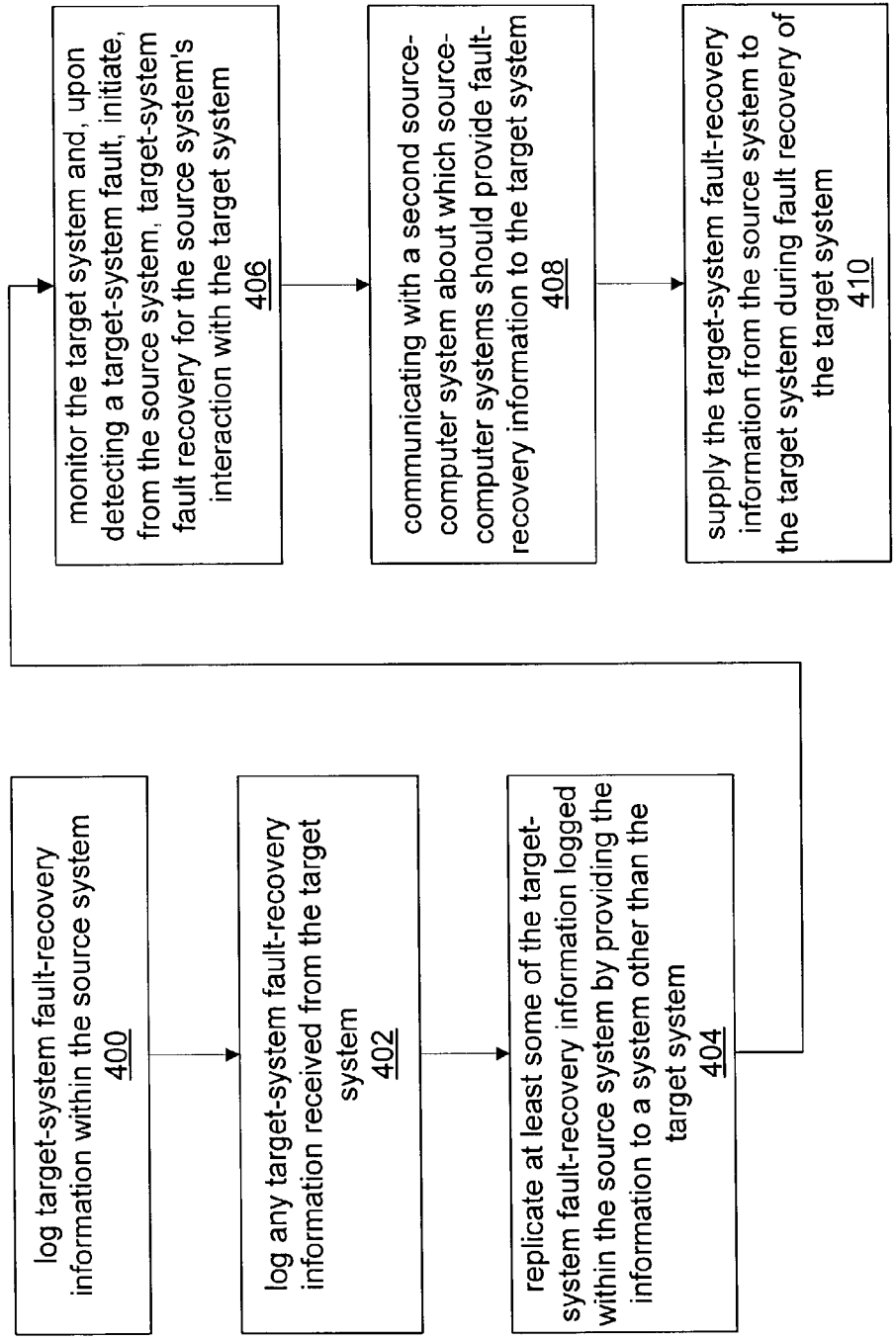
FIG. 4 is a flowchart showing steps that may be performed by a source-computer system in accordance with various illustrative embodiments of the invention.

FIG. 4 depicts steps that may be performed by a source-computer system in accordance with an illustrative embodiment of the invention. Various steps shown in FIG. 4 may be omitted from various illustrative embodiments of the invention and/or may be performed in any suitable order other than the order in which they are shown in FIG. 4. At step 400, the source-computer system may log target-system fault-recovery information within the source-computer system. At step 402, the source-computer system may log any target-system fault-recovery information received from target-computer system.

The source-computer system may replicate at least some of the target-system fault-recovery information logged within the source-computer system by providing the information to a system, such as a different source-computer system, other than the target-computer system, as depicted at 404.

The source-computer system may monitor the target-computer system and, upon detecting a target-system fault, the source-computer system may initiate target-system fault recovery for the source-computer system's interaction with the target-computer system, as depicted at 406. In this way, a target-computer system may rely on the source-computer systems with which the target-computer system has interacted to contact the target-computer system and initiate fault-recovery of the target-computer system. Alternatively, after a target-computer system has had a fault, the next time a source-computer system contacts the target computer system to perform a transaction, the target computer may request fault-recovery information from the source-computer system before performing the transaction. As depicted at step 408, the source-computer system may communicate with a second source-computer system about which source-computer systems should provide fault-recovery information to the target-computer system.

The source-computer system then supplies the target-system fault-recovery information to the target-computer system during fault recovery of the target-computer system, as depicted at 410.

Figure 5:
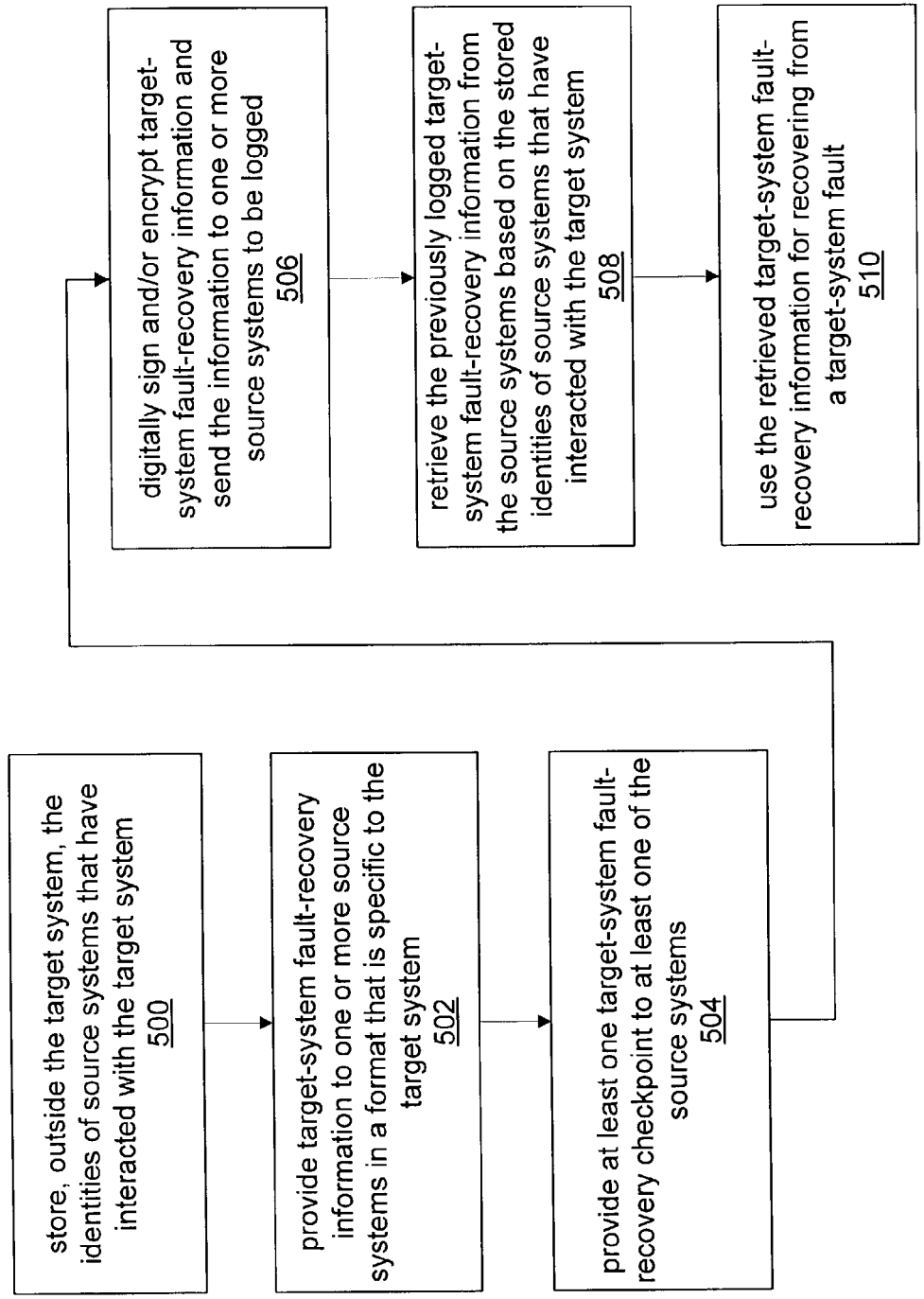
FIG. 5 is a flowchart showing steps that may be performed by a target-computer system in accordance with various illustrative embodiments of the invention.

FIG. 5 depicts steps that may be performed by a target-computer system in accordance with an illustrative embodiment of the invention. Various steps shown in FIG. 5 may be omitted from various illustrative embodiments of the invention and/or may be performed in any suitable order other than the order in which they are shown in FIG. 5. At step 500, the target-computer system may store, outside the target-computer system, the identities of source-computer systems that have interacted with the target-computer system.

As depicted at 502, the target-computer system may provide target-system fault-recovery information to one or more source-computer systems in a format that is specific to the target-computer system. In this way, the fault-recovery information may be stored in a format that is optimized for allowing the target-computer system to recover as efficiently as possible from a fault.

The target-computer system may then provide at least one target-system fault-recovery checkpoint to at least one of the source-computer systems, as depicted at 504. As discussed above, a checkpoint of this type may act as a summary of the target-computer systems state at a particular point in time.

The target-computer system may digitally sign and/or encrypt target-system fault-recovery information and send the information to one or more source-computer systems to be logged to persistent storage, as depicted at 506.

The target-computer system may then retrieve the previously logged target-system fault-recovery information from the source-computer systems based on the stored identities of source-computer systems that have interacted with the target-computer system, as depicted at 508. The target-computer system may then use the retrieved target-system fault-recovery information for recovering from a target-system fault, as depicted at 510.

What has been described above is illustrative of the application of various inventive principles. Those skilled in the art can implement other arrangements and methods without departing from the spirit and scope of the present invention, as defined by the claims below and their equivalents. Any of the methods of the invention can be implemented in software that can be stored on computer disks or other computer-readable media.

We claim:

1. A source-computer system that participates in fault recovery of a plurality of target-computer systems, the source-computer system having at least one source computer and comprising:

a logging module that logs, within the source-computer system, target-system fault-recovery information for the plurality of target-computer systems, wherein the target-system fault-recovery information specifies a plurality of operations and outcomes describing interaction between a source computer within the source-computer system and the plurality of target-computer systems; and wherein, during fault recovery of the respective target-computer systems, the source-computer system provides to at least one of the plurality of target-computer systems a portion of the target-system fault-recovery information that pertains to the at least one of the plurality of target-computer systems, wherein the portion of the target-system fault recovery information includes log records that, when played back by the at least one target-computer system, caused the at least one target-computer system to return to a target-computer-system state that existed before occurrence of a target-computer-system fault for which fault recovery is being performed.

2. The source-computer system of claim 1, wherein the logging module runs on a proxy server that is separate from the source computer.

3. The source-computer system of claim 1, wherein the proxy server is geographically remote from the source computer.

4. The source-computer system of claim 1, wherein the target-system fault-recovery information identifies to which of the plurality of target-computer systems the target-system fault-recovery information pertains.

5. The source-computer system of claim 1, wherein at least source of the target-system fault-recovery information logged within the source-computer system is provided to the source-computer system by at least one of the target-computer systems.

6. The source-computer system of claim 5, wherein the target-system fault-recovery information logged within the source-computer system is digitally signed such that the target-system fault-recovery information's authenticity is verifiable.

7. The source-computer system of claim 5, wherein the target-system fault-recovery information logged within the source-computer system is encrypted thereby preserving the privacy of the target-system fault-recovery information.

8. The source-computer system of claim 5, wherein the source-computer system receives, from at least one of the target-computer systems, at least a portion of the target-system fault-recovery information in a target-system-specific format.

9. The source-computer system of claim 1, wherein at least some of the target-system fault-recovery information logged within the source-computer system replicates target-system fault-recovery information that describes interaction between at least one of the target-computer systems and a system other than the source-computer system.

10. The source-computer system of claim 1, wherein the source-computer system provides, to a system other than the target-computer system, at least some of the target-system tank-recovery information logged within the source-computer system thereby replicating at least a portion of the target-system fault-recovery information.

11. The source-computer system of claim 1, wherein a source computer of the source-computer system is a computer that is part of a peer-to-peer system.

12. The source-computer system of claim 1, wherein a source computer of the source-computer system is a client computer in a client-server system.

13. The source-computer system of claim 1, wherein the source-computer system monitors at least one of the target-computer systems and upon detecting a target-system fault, initiates target-system fault recovery for interaction that the source-computer system has had with the target-computer system for which a fault has been detected.

14. The source-computer system of claim 1, wherein, during fault recover of at least one of the target-computer systems, the source-computer system communicates with a second source-computer system about which source-computer systems should provide fault-recovery information to the target-computer system being recovered.

15. A target-computer system that uses distributed fault-recovery information for recovering from target-system faults, the target-computer system comprising:

a source-system-identity storage module that coordinates storage of an identity of each source-computer system that the target-computer system has interacted with and which has logged target-system fault-recovery information, wherein the source-system-identity storage module coordinates storage of an identity of at least one proxy server used on be behalf of a least one source computer fix logging target-system fault-recovery information;

a fault-recovery-information-retrieval module that retrieves the previously logged target-system fault-recovery information from at least one source-computer system based on the at least one stored identity of source-computer systems that the target-computer system has interacted with; and a fault-recovery module that uses the retrieved target-system fault-recovery information for recovering from a target-system fault.

16. The target-computer system of claim 15, wherein the source-system-identity storage module provides the at least one identity of source-computer systems to at least one source-computer system for storage by the source-computer system.

17. The target-computer system of claim 15, wherein the source-system-identity storage module provides the at least one identity of source-computer systems to a plurality of source-computer systems for storage by the plurality of source-computer systems.

18. The target-computer system of claim 17, wherein the source-system-identity storage module provides the at least one identity of source-computer systems to an escrow server far storage by the escrow server.

19. The target-computer system of claim 17, wherein the target-system fault-recovery information specifies a plurality of operations and outcomes describing interaction between the target-computer system and each source-computer system that has interacted with the target-computer system.

20. The target-computer system of claim 17, wherein the target-computer system provides at least some of the target-system fault-recovery information to a least one source-computer system for logging by the source-computer system.

21. The target-computer system of claim 20, wherein the target-computer system serializes the target-system fault-recovery information provided to the at least one source-computer system.

22. The target-computer system of claim 21, wherein the fault-recovery module verifies that target-system fault-recovery information retrieved from the at least one source-computer system is properly serialized.

23. The target-computer system of claim 20, wherein the target-system fault-recovery information provided to the at least one source-computer system is digitally signed such that the target-system fault-recovery information's authenticity is verifiable.

24. The target-computer system of claim 20, wherein the target-system fault-recovery information provided to the at least one source-computer system is encrypted thereby preserving the privacy of the target-system fault-recovery information.

25. The target-computer system of claim 21, wherein the target-computer system provides the target-system fault-recovery information to the at least one source-computer system in a target-system-specific format.

26. The target-computer system of claim 20, wherein the target-computer system provides a target-system fault-recovery checkpoint to at least one of the source-computer systems.

27. The target-computer system of claim 26, wherein the target-computer system provides a plurality of target-system fault-recovery checkpoints to a corresponding plurality of source-computer systems.

28. The target-computer system of claim 20, wherein the target-computer system provides a plurality of portions of a target-system fault-recovery checkpoint to a corresponding plurality of source-computer systems.

29. The target-computer system of claim 15, wherein the proxy sewer is geographically remote from the at least one source computer.

30. The target-computer system of claim 15, wherein the target-computer system includes a server in a client-server system.

31. The target-computer system of claim 15, wherein the target-computer system includes a computer in a peer-to-peer system.

32. A method performed by a source-computer system of participating in fault recovery of a target-computer system, wherein the source-computer system includes at least one source computer, the method comprising:
  logging target-system fault-recovery information within the source-computer system, wherein the target-system fault-recovery information specifies a plurality of operations and outcomes describing interaction between the source-computer system and the target-computer system; and
  supplying the target-system fault-recovery information from the source-computer system to the target-computer system during, fault recovery of the target-computer system, wherein the target-system fault recovery information includes log records that, when played back by the target-computer system, cause the target-computer system to return to a target-computer-system state that existed before occurrence of a target-computer-system fault for which fault recovery is being performed.

33. The method of claim 32, further comprising using the target-system fault-recovery information as the source-computer system's audit trail for the source-computer system's interaction with the target-computer system.

34. The method of claim 32, further comprising: using the target-system fault-recovery information for detecting occurrence of target-computer-system faults.

35. The method of claim 32, wherein the target-system fault-recovery information identifies the target-computer system.

36. The method of claim 32, wherein the source-computer system receives from the target-computer system at least some of the target-system fault-recovery information logged within the source-computer system.

37. The method of claim 36, wherein the target-system fault-recovery information logged within the source-computer system is digitally signed such that the target-system fault-recovery information's authenticity is verifiable.

38. The method of claim 36, wherein the target-system fault-recovery information logged within the source-computer system is encrypted thereby preserving the privacy of the target-system fault-recovery information.

39. The method of claim 36, further comprising receiving the target-system fault-recovery information from the target-computer system in a target-system-specific format.

40. The method of claim 32, wherein at least some of the target-system fault-recovery information logged within the source-computer system replicates target-system fault-recovery information tat describes interaction between the target-computer system and a system other than the source-computer system.

41. The method of claim 32, further comprising replicating at least some of the target-system fault-recovery information logged within the source-computer system by providing, to a system other than the target-computer system, the replicated target-system fault-recovery information.

42. The method of claim 32, further comprising using a proxy server to store the target-system fault-recovery information.

43. The method of claim 32, further comprising monitoring the target-computer system and, upon detecting a target-system fault, initiating, from the source-computer system, target-system fault recovery for the source-computer system's interaction with he target-computer system.

44. The method of claim 32, further comprising communicating with a second source-computer system about which source-computer systems should provide fault-recovery information to the target-computer system.

45. A method of using distributed fault-recovery information for fault-recovery of a target-computer system, the method comprising:
  storing, outside the target-computer system, a plurality of identities of source-computer systems that have interacted with the target-computer system, wherein the plurality of identities of source-computer systems that have interacted with the target-computer system includes an identity of at least one proxy server that has logged target-system fault-recovery information on behalf of at least one source computer;
  retrieving previously logged target-system fault-recovery information from a plurality of source-computer systems based on the stored plurality of identities of source-computer systems that have interacted with the target-computer system; and
  using the retrieved target-system fault-recovery information for recovering from a target-system fault.

46. The method of claim 45, wherein the target-system fault-recovery information specifies a plurality of operations and outcomes describing interaction between at least one of the source-computer systems and the target-computer system.

47. The method of claim 45, further comprising: using the target-system fault-recovery information for detecting occurrence of target-computer-system faults.

48. The method of claim 45, wherein the target-computer system provides at least some of the target-system fault-recovery information to the source-computer system for logging.

49. The method of claim 48, wherein the target-computer system serializes the target-system fault-recovery information provided to the source-computer system.

50. The method of claim 49, wherein the target-computer system verifies that target-system fault-recovery information retrieved from the source-computer system is properly serialized.

51. The method of claim 48, further comprising digitally signing the target-system fault-recovery information provided to the source-computer systems such that the target-system fault-recovery information's authenticity is verifiable.

52. The method of claim 51, further comprising storing, separates from the source-computer systems and separate from the target-computer system, at least one digital-signature key used for verifying the authenticity of the target-system fault-recovery information provided to the source-computer system.

53. The method of claim 48, further comprising encrypting the target-system fault-recovery information provided to the source-computer system thereby preserving the privacy of the target-system fault-recovery information.

54. The method of claim 53, further comprising storing, separate from the source-computer systems and separate from the target-computer system, at least one encryption key used for encrypting the target-system fault-recovery information provided to the source-computer systems.

55. The method of claim 45, wherein the target-computer system provides at least some of the target-system fault-recovery information to the source-computer system in a target-system-specific format.

56. The method of claim 45, further comprising providing at least one target-system fault-recovery checkpoint to at least one of the source-computer systems.

57. The method of claim 56, further comprising providing a plurality of target-system fault-recovery checkpoints to a corresponding plurality of the source-computer systems.

58. The method of claim 45, further comprising providing a plurality of portions of a target-system fault-recovery checkpoint to a corresponding plurality of the source-computer systems.

* * * * *

UNITED STATES PATENT AND TRADEMARK OFFICE
CERTIFICATE OF CORRECTION

PATENT NO. : 7,065,674 B2
APPLICATION NO. : 10/209773
DATED : June 20, 2006
INVENTOR(S) : Cabrera et al.

It is certified that error appears in the above-identified patent and that said Letters Patent is hereby corrected as shown below:

In column 6, line 67, delete "(i,e.," and insert -- (i.e., --, therefor.

In column 10, line 47, delete "2021" and insert -- 202-1 --, therefor.

In column 10, line 52–67, and column 11, line 1–6, delete
"Logging identification information for the various source-computer systems 200 that have had transactional interactions with a particular target-computer system may be done in various ways. For example, sets of source-computer systems 200 may store information about each other regarding their respective interactions with various target computer systems 202. This information may include identification information for any external proxy servers used for logging fault-recovery information. Under normal operation, a target-computer system 202 may provide this type of information for redundant storage by multiple source-computer systems 200. During recovery of a target-computer system 202, the source-computer systems 200 may communicate with each other, as indicated by double-headed arrow 214 in
    FIG. 2, regarding which source-computer systems 200 should send fault-recovery information to the target-computer system 202. This gossip-like dissemination of source-computer system-identification information provides a source-computer-system-based storage of this information in the absence of any central "white pages" that identifies the source-computer systems 200 that have interacted with a particular target-computer system 202." and insert
-- Logging identification information for the various source-computer systems 200 that have had transactional interactions with a particular target-computer system may be done in various ways. For example, sets of source-computer systems 200 may store information about each other regarding their respective interactions with various target computer systems 202. This information may include identification information for any external proxy servers used for logging fault-recovery information. Under normal operation, a target-computer system 202 may provide this type of information for redundant storage by multiple source-computer systems 200. During recovery of a target-computer system 202, the source-computer systems 200 may communicate with each other, as indicated by double-headed arrow 214 in FIG. 2, regarding which source-computer systems 200 should send fault-recovery information to the target-computer system 202. This gossip-like dissemination of source-computer system-identification information provides a source-computer-system-based storage of this information in the absence of any central "white pages" that identifies the source-computer systems 200 that have interacted with a particular target-computer system 202. --, therefor.

CERTIFICATE OF CORRECTION (continued)
U.S. Pat. No. 7,065,674 B2

In column 13, line 1, in Claim 1, delete "caused" and insert -- cause --, therefor.

In column 13, line 17, in Claim 5, delete "source" and insert -- some --, therefor.

In column 13, line 44, in Claim 10, delete "tank-recovery" and insert -- fault-recovery --, therefor.

In column 13, line 60, in Claim 14, delete "recover" and insert -- recovery --, therefor.

In column 14, line 7, in Claim 15, after "used on" delete "be".

In column 14, line 7, in Claim 15, delete "a" and insert -- at --, therefor.

In column 14, line 8, in Claim 15, delete "fix" and insert -- for --, therefor.

In column 14, line 33, in Claim 18, delete "far" and insert -- for --, therefor.

In column 14, line 42, in Claim 20, delete "a" and insert -- at --, therefor.

In column 15, line 14, in Claim 29, delete "sewer" and insert -- server --, therefor.

In column 15, line 34, in Claim 32, after "during" delete ",".

In column 16, line 4, in Claim 40, delete "tat" and insert -- that --, therefor.

In column 16, line 19, in Claim 43, delete "he" and insert -- the --, therefor.

Signed and Sealed this

Thirteenth Day of April, 2010

David J. Kappos
*Director of the United States Patent and Trademark Office*